(12) United States Patent
Beas Bujanos

(10) Patent No.: US 11,750,288 B2
(45) Date of Patent: *Sep. 5, 2023

(54) RADIO FREQUENCY OVER GLASS SYSTEM WITH RADIO FREQUENCY OVER GLASS FIBER EXTENDER

(71) Applicant: ARRIS Enterprises LLC, Suwanee, GA (US)

(72) Inventor: Joaquin Beas Bujanos, Escobedo (MX)

(73) Assignee: ARRIS Enterprises LLC, Suwanee, GA (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/203,559

(22) Filed: Mar. 16, 2021

(65) Prior Publication Data

US 2021/0211196 A1 Jul. 8, 2021

Related U.S. Application Data

(60) Continuation of application No. 16/549,126, filed on Aug. 23, 2019, now Pat. No. 10,958,346, which is a
(Continued)

(51) Int. Cl.
*H04B 10/2575* (2013.01)
*H04J 14/02* (2006.01)
*H04Q 11/00* (2006.01)

(52) U.S. Cl.
CPC ........ *H04B 10/2575* (2013.01); *H04J 14/023* (2013.01); *H04Q 11/0071* (2013.01)

(58) Field of Classification Search
CPC .......... H04B 10/2575; H04B 10/25754; H04J 14/023; H04Q 11/0071
See application file for complete search history.

(56) References Cited

U.S. PATENT DOCUMENTS 5,331,449 A 7/1994 Huber et al.
5,765,097 A 6/1998 Dail
(Continued)

FOREIGN PATENT DOCUMENTS

| CA | 945929 A1 | 10/2015 |
|---|---|---|
| CA | 2946291 A1 | 10/2015 |
| EP | 1235434 A2 | 8/2002 |

OTHER PUBLICATIONS

Stoneback ,"The Evolution of Hybrid Fiber-Coaxial Cable Networks to an All-Fiber Network", Jun. 13, 2011,Optical Fiber Communication Conference/National Fiber Optic Engineers Conference 2011,pp. 1-3.*
(Continued)

*Primary Examiner* — Omar S Ismail
(74) *Attorney, Agent, or Firm* — Chernoff, Vilhauer, McClung & Stenzel, LLP

(57) ABSTRACT

The present disclosure provide for a radio frequency over glass (RFoG) system having an optical node and an RFoG extender residing in a first service area coupled to the optical node. The RFoG functions to transmit an upstream (US) radio frequency (RF) signal to a head end, receive a downstream (DS) RF signal from the head end and extend the DS RF signal to the second service area. The second service area is different from the first service area and the second service area is remote from the first service area.

11 Claims, 11 Drawing Sheets

Related U.S. Application Data division of application No. 15/789,364, filed on Oct. 20, 2017, now Pat. No. 10,439,723.

(56) References Cited

U.S. PATENT DOCUMENTS

| | | | |
|---|---|---|---|
| 9,723,370 B2 | 8/2017 | Mutalik et al. | |
| 2004/0139477 A1 | 7/2004 | Russell et al. | |
| 2005/0289628 A1 | 12/2005 | Basil et al. | |
| 2009/0110398 A1* | 4/2009 | Pfeiffer | H04B 10/272 398/63 |
| 2011/0142447 A1* | 6/2011 | Boyd | H04B 10/25751 398/58 |
| 2012/0093515 A1* | 4/2012 | Lin | H04J 14/0247 398/79 |
| 2012/0106964 A1* | 5/2012 | Sniezko | H04B 10/25751 398/67 |
| 2012/0275792 A1* | 11/2012 | Nandiraju | H04J 14/0298 398/66 |
| 2013/0004173 A1 | 1/2013 | Maricevic et al. | |
| 2013/0266049 A1* | 10/2013 | Fox | H04L 69/04 375/222 |
| 2013/0266310 A1* | 10/2013 | Fox | H04B 3/04 375/222 |
| 2013/0279914 A1* | 10/2013 | Brooks | H04Q 11/0067 398/43 |
| 2014/0314412 A1* | 10/2014 | Soto | H04B 10/272 398/67 |
| 2014/0348511 A1* | 11/2014 | Mutalik | H04B 10/64 398/136 |
| 2015/0043918 A1 | 2/2015 | Maricevic et al. | |
| 2015/0046964 A1 | 2/2015 | Thompson et al. | |
| 2015/0304034 A1 | 10/2015 | Mutalik et al. | |
| 2015/0304744 A1 | 10/2015 | Maricevic et al. | |
| 2016/0277112 A1* | 9/2016 | Dai | H04B 10/272 |
| 2016/0337728 A1* | 11/2016 | Vogel | H04J 14/0212 |
| 2017/0019347 A1* | 1/2017 | Al-banna | H04L 5/0037 |

OTHER PUBLICATIONS

Christophe Lethien,"Energy-Autonomous Picocell Remote Antenna Unit for Radio-Over-Fiber System Using the Multiservices Concept,"Mar. 28, 2012,IEEE Photonics Technology Letters, vol. 24, No. 8, Apr. 15, 2012,pp. 649-650.*

J. Ulm, et al., "HFC Transformation To FTTP: The Role of RFOG, PON and Hybrid Solutions", Arris Technical Paper prepared for Society of Cable Telecommunications Engineers, 2015.

S. Esser, "WDM/CWDM/DWDM—Segmentation Primer; Maximizing Capacity for Revenue", Motorola, Inc., 2008.

L. Venton, "Powering PON With HFC, A Hybrid for a New Generation", Arris Enterprises, Inc., 2014.

G. Castañón, et al., "High reliability and availability in radio over fiber networks", Journal of Optical Networking, vol. 7, No. 6 / Jun. 2008.

"Fiber Link Module 10G Epon Extender", ARRIS Enterprises, Inc., Oct. 2015.

"Radio Frequency over Glass Fiber-to-the-Home Specification", SCTE 174 2010, Engineering Committee Interface Practices Subcommittee, Society of Cable Telecommunications Engineers, Inc. 2010.

M. Emmendorfer, "Next Generation Networks for Multiple Dwelling Units (MDU)", Arris Enterprises, Inc., 2014.

Canada Office Action Re: Application No. 3,021,725, dated Aug. 7, 2020.

* cited by examiner ns pag# RADIO FREQUENCY OVER GLASS SYSTEM WITH RADIO FREQUENCY OVER GLASS FIBER EXTENDER The present application is a continuation of U.S. patent application Ser. No. 16/549,126 filed Aug. 23, 2019, which is a divisional of U.S. patent application Ser. No. 15/789,364 filed Oct. 20, 2017, now U.S. Pat. No. 10,439,723 issued on Oct. 8, 2019, the contents of which are hereby incorporated by reference in their entirety.

TECHNICAL FIELD

The present disclosure relates to a field of hybrid fiber coax (HFC) network. More particularly, examples relate to implementations with a radio frequency over glass (RFoG) extender at one of a customer premise equipment (CPE) or a multi-dwelling unit (MDU) CPE in a RFoG system to extend network coverage to another CPE (remote from the CPE) or another MDU CPE (remote from the MDU CPE).

BACKGROUND

The Hybrid Fiber-Coax (HFC) network has continuously evolved to deploy fiber deeper. It is foreseen that in the near future, it will become a Fiber to the Premise (FTTP) or Fiber to the Home (FTTH) network. One of the technologies in consideration to allow this transition is Radio Frequency over Glass (RFoG). RFoG is a deep-fiber network design in which the coax portion of the hybrid fiber coax (HFC) network is replaced by a single-fiber passive optical network (PON). in order to deliver cable services through the passive optical network (PON) style FTTP network infrastructure .PON is a telecommunications technology that implements a point-to-multipoint architecture, in which unpowered fiber optic splitters are used to enable a single optical fiber to serve multiple end-points such as customers, without having to provision individual fibers between the hub and customer. The RFoG system is defined to begin where the network becomes passive, extending from that point to the customer premise (CPE). This interface is referred to as the optical node. The CPE is a service provider equipment that is located on the customer's premises (physical location) rather than on the provider's premises or in between. Some examples of the CPE include, but not limited telephone handsets, cable TV set-top boxes, and digital subscriber line routers. The RFoG system is defined to terminate at the subscriber-side interface of an RFoG Optical Network Unit (R-ONU) or customer premise equipment (CPE) at the home. An optical network is a means of communication that uses signals encoded onto light to transmit information among various nodes of a telecommunications network.

As part of the continuous effort to converge towards next-generation networks (NGN), the RFoG has been designed to share trunk fibers with the traditional Passive Optical Network (PON). A RFoG implementation that supports the data over cable services interface specification (DOCSIS) RF infrastructure along with traditional PON has been considered as the truly Hybrid PON (HPON) architecture. HPON enables other fiber deep technologies such as Fiber to the Curb (FTTC), Fiber to the Multiple Dwelling Unit (FTT-MDU), and fiber to the deep node (N+0). As HPON becomes popular as a network capable to provide higher amounts of bandwidth than legacy HFC, and as it becomes commercially attractive for operators, the increasing demand of network coverage is driving new requirements for key enabling products. It is the case when the fiber links from the hubs to the optical nodes are very long distances. Even when some operators were careful to deploy enough nodes to assure that the vast majority of the fiber distances were 20 km or less (e.g. PON services). Other operators allowed much longer fiber distances (~60 km) to be used (e.g. RFoG). The long fiber distances in these HPON networks negatively impacts the available performance budget and makes it difficult to further increase network coverage. In addition, there are other difficulties such as the limited number of trunk fibers, and the wavelength congestion at each fiber. For the latter, it is worth noting that HPON networks are required to operate at specific wavelengths for a Downstream (DS) and an Upstream (US) in order to allow coexistence between PON and RFoG services. Therefore, it is not possible to operate more than one service (RFoG+PON) group on the same trunk fiber at the same time.

In case of PON systems, in order to accommodate the long distances and limited numbers of fibers, many operators are deploying PON extenders. The PON extender is an active device in the node that regenerates the electrical signals so that they can be retransmitted to the local serving area with high fidelity, eliminating the penalty of long link budgets between hubs and nodes. On the other hand, for RFoG services, EP patent publication number EP1235434 B1 describes a "dual broadband optoelectronic repeater" which makes it possible to use the network topology of the point-to-point type from the node to each individual subscriber to extend the performance budget. The EP 1235434 proposes to eliminate branches between the CPE and the final optical transmitter or receiver in the dual broadband optoelectronic repeater. However, the aforementioned repeater presents several disadvantages in terms of cost effectiveness, power consumption, coverage and capacity. In the forward (a.k.a. downstream) path, receiving, amplifying and retransmission of DS signals with one laser per subscriber increases considerable cost and power dissipation. In addition, since the repeater is proposed at the node location, it still presents link budget limitation when the network coverage increase is required further away from the node's service area.

An example of a RFoG architecture 100 is illustrated in FIG. 1 when a network coverage extension is needed from a first service area 108 to another new remote service area (second service area) 110. An optical node 104 depicted in FIG. 1 is an active RFoG node. The RFoG node is used for fiber deep applications, where service areas (first service are 108 and second service area 110) are connected via optical fiber to the node. In the implementation, as shown in FIG. 1, the conversion of optical/electrical for DS signals and the conversion of electrical/optical for US signals occur at the service area location in the MDU. The optical node 104 is optically coupled to a head end 102. A head end includes multiple devices for delivery of video and data services including EdgeQAMS (EQAMs) for video, cable modem termination systems (CMTS) for data, and other processing devices for control and management. These systems are connected to multiple fiber optic cables that go to various neighborhood locations. A fiber optic neighborhood node is located between each fiber optic cable and a corresponding trunk cable which in turn is interconnected to the homes through branch networks and feeder cables. Because the trunk cable, as well as the branch networks and feeder cables, each propagate RF signals using coaxial cable, HFC nodes (preferably located in the MDU) are used to convert the optical signals to electrical signals that can be transmitted through a coaxial medium, i.e. copper wire to be distributed at homes. The optical node 104 of FIG. 1, as discussed above is an active RFoG node transmits and receives optical signals from the head end 102 and to MDUs. Similarly, when electrical signals from the home reach the node over the coaxial medium, those signals are converted to optical signals and transmitted across the fiber optic cables back to the systems at the head end. Accordingly, a head end is a control system that receives RF signals for processing and distribution over a cable television system. Specifically, the head end receives the RF signals containing data signals, multiplexes them using a RF combining network, converts the combined RF signal to an optical signal and outputs the output signal. The combined and converted RF signals comprise a downstream (DS) signal, which refers to a signal transmitted from the head end 102 to the optical node 104 to an end user via a network (example, coaxial network, local network, etc.). In the upstream (US) direction, the combined and converted RF signals comprise a (US) signal, which refers to a signal transmitted from the end user to the head end 102. The optical node 104 functions to extract the traditional cable signals such as the DS signal having the wavelength of 1550 nm and the US signal having the wavelength of 1610 nm. The traditional cable signals are processed to be sent to the first service area 108 and to the second service area 110. The optical node 104 is also coupled to a PON unit 106 to provide cable services to PON network (not shown). Some examples of a PON network include Broadband PON, Gigabit PON, Ethernet PON. In the scenario presented in FIG. 1, it is assumed that a multiple dwelling unit (MDU) in the first service area 108 contains multiple MDU CPEs 112a-112n. However, network coverage increase can apply in other scenarios, such as but not limited to service areas where each user has direct fiber connection to home with independent CPEs connected directly to the optical node 104. As shown in FIG. 1, is an RFoG network coverage to the first service area 108 (distance=FLn−1(a)). A typical way to increase coverage in the RFoG network, is the introduction of expensive low-distortion optical amplifiers, extra optical splitting, and external dispersion compensation modules at the optical node 106 to achieve a good quality signal at longer distances in order to service additional remote areas (distance=FLn−1(a)+FLn−1 (b) from FIG. 1). However, this implementation only provides budget performance extension for the forward or the downstream (DS), and the return or upstream (US) still suffers poor signal quality. On the other hand, an extra optical fiber from the optical node 104 to the second service area 110 is required. Therefore, in most of the cases, it may be preferable to install another remote node at a location closer to the second service area 110 in order to increase network coverage. This approach includes the necessity to install new fiber links all the way down from the Head End 102 to the new node and to a MDU CPE 114 in the second service area 110.

FIGS. 2A and 2B illustrate a schematic diagram of conventional MDU CPE devices 200 and 240 respectively typically used by the cable operators to provide both traditional cable service and PON service on RFoG system expanded to support PON architecture and services. Specifically, FIG. 2A depicts a conventional MDU CPE device 200 over RFoG architecture with an option to upgrade to a PON optical network unit (ONU) outside of the MDU CPE and FIG. 2B depicts a conventional MDU CPE device 240 over RFoG architecture including the PON ONU integrated into the same MDU CPE device. In one example, there is shown an RFoG wavelength division multiplexer (WDM) filter 204 optically coupled to a head end 202. As discussed above, a Head End is a control system that receives data (such as television, internet, voice etc.) signals for processing and distribution over a cable television system. The RFoG WDM filter 204 functions similar to the optical node 104 of FIG. 1 such that the first optical filter 104 extracts the traditional cable signals (DS optical signal having the wavelength of 1550 nm and US optical signal having the wavelength of 1610 nm). As such, the RFoG WDM filter 204 functions to separate the DS optical signal from the US optical signal. The RFoG WDM filter 204 transmits the DS optical signal to a first RFoG optical receiver (RFoG optical RX1) 206, which converts the DS optical signal into RF domain into a DSRF signal containing data. The RFoG optical RX1 206 sends the DSRF signal to a diplexer 210. Data may flow not only from the head end 102 to a MDU coaxial network 212 to reach the various neighborhoods, but also from the MDU coaxial network 212 to the head end 102, In order to provide this functionality, typically one spectrum of frequencies are dedicated to deliver forward (DS) path signals from the head end 102 to a MDU coaxial network 212 to reach the various neighborhood locations and another (typically much smaller) spectrum of frequencies are dedicated to deliver return (US) path signals from the MDU coaxial network 212 to the head end 102. The diplexer 210 provides such functionality. Specifically, the diplexer 210 includes two or more band pass filters to separate the forward (DS) path signals from the return (US) path signals, and separately amplifies the signals from each respective direction in their associated frequency range. The diplexer 210 includes a high frequency filter 210a and a low frequency filter 210b. As such, the DSRF signal is filtered in the high frequency mode of the diplexer 210 and the filtered DSRF signal is outputted to the MDU coaxial network 212 for connection to different users. The diplexer 210 receives the USRF signal from the MDU coaxial network in the low frequency mode and transmits to the analog driver 214. In one example, the analog driver 214 is an RF amplifier which functions to convert a lower power radio frequency signal into a higher power radio frequency signal. As such, the analog driver 214 increases the power of the USRF signal. The analog driver 214 transmits the USRF signal to a first RFoG optical transmitter (RFoG optical TX1) 208, which converts it back into the optical domain to an US optical signal and transmits to the RFoG WDM filter 204 to be transmitted to head end 202. As shown in FIG. 2A is a first link from the RFoG WDM filter 204 to couple with a local PON network (not shown) as an option to upgrade to PON cable services via a PON located outside of the MDU CPE device 200.

FIG. 2B shows a PON extender 241 integrated within the MDU CPE device 240 to extend PON cable services such that one MDU may support both the traditional cable service (Coaxial) and the PON cable service. The PON extender 241 includes a PON optical unit (ONU) 242, a PON WDM filter 244, a first PON optical receiver (PON optical RX1) 246, and a first PON optical transmitter (PON optical TX1) 248 and a digital driver 250. A PON ONU may be a gigabit PON (GPON or gigabit Ethernet PON (GEPON) chip sets. The PON WDM filter 244, extracts the PON services (DS PON optical signal having the wavelength of 1490 nm and US PON optical signal having the wavelength of 1310 nm) received from the head end 202. The PON WDM filter 244 transmits the DS PON optical signal to the PON optical RX1 246, which converts the DS PON optical signal into RF domain into a DSRF PON signal containing data, which is transmitted to the PON ONU 242. The PON ONU 242 is an active device that regenerates the RF signals in order to be retransmitted to a local PON network 252. As such the regenerated DSRF PON signal containing data is outputted from the PON ONU 242 to the local PON network 252 to different users. The PON ONU 242 receives the USRF PON signal via the PON local network 252 and transmits it to the digital driver 250, which functions to convert a lower power RF signal into a higher power RF signal. As such, the digital driver 250 increases the power of the USRF PON signal. The digital driver 250 transmits the USRF PON signal to the RFoG optical TX1248, which converts it back into the optical domain to US optical signal and transmits the US PON optical signal to the PON WDM filter 244 to be transmitted to Head End 202.

The conventional MDU CPEs as described above with respect to FIGS. 2A and 2B are limited to provide RFoG network coverage to one service area and thus do not accommodate the increasing demand of extending the RFoG network coverage to other remote service areas without the need to add more optical fibers and amplifiers (as discussed above with respect to FIG. 1), which results in increase in cost, power consumption, coverage and capacity of the RFoG network.

SUMMARY

The present disclosure describes a RFoG architecture with a RFoG extender, which provides capabilities to provide RFoG network coverage not only into a MDU CPE located in a service area but also extends RFoG network coverage to one or more new service areas, which are remote from the service area.

According to one implementation, the RFoG system includes an optical node and an RFoG extender residing in a first service area and coupled to the optical node. The RFoG extender transmits an upstream (US) radio frequency (RF) signal to a head end and receives a downstream (DS) RF signal from the head end. The RFoG extender extends the DSRF signal to the second service area, which is different and remote from the first service area. The RFoG extender located at the first service area also extends the USRF signal from the second service area to the head end.

According to another implementation, the RFoG system includes an optical node and an RFoG extender residing in a first area and coupled to the optical node. The RFoG extender transmits an upstream (US) radio frequency (RF) signal to a head end and receives a downstream (DS) RF signal from the head end. The RFoG extender extends the DSRF signal to the second service area, which is different and remote from the first service area. The RFoG system in this example also includes a passive optical network (PON) extender that resides in the first service area and is coupled to the optical node. The PON extender transmits a US PON signal to a local PON network, receives a DS PON network from the local PON network, extends the DS PON signal to the second service area and extends the US PON signal from the second service area to the head end.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations by way of example only, not by way of limitations. In the figures, like reference numerals can refer to the same or similar elements. According to common practice, the various features of the drawings are not drawn to the scale. Also, the dimensions of the various features may be arbitrarily expanded or reduced for clarity. Included in the drawings are the following figures.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high level, without detail, in order to avoid unnecessarily obscuring aspects of the present teachings.

Figure 1:
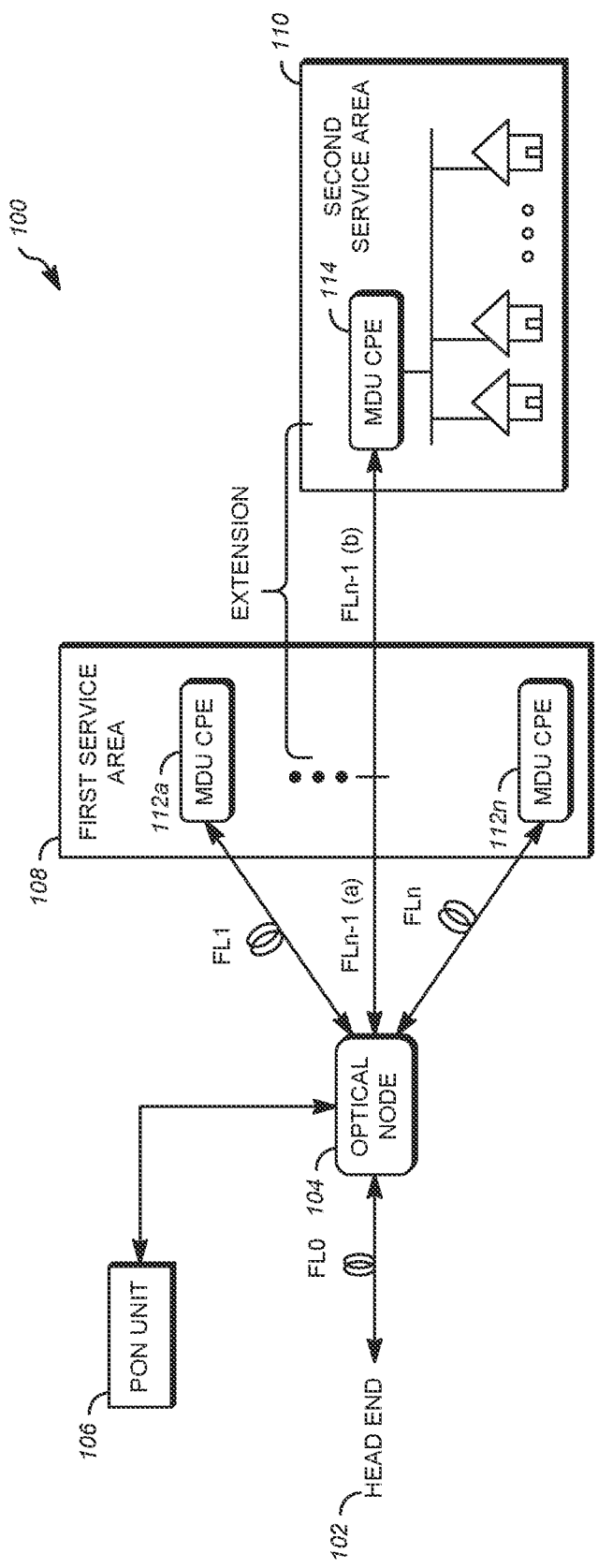
FIG. 1 depicts a conventional radio frequency over glass (RFoG) architecture.
Figure 3:
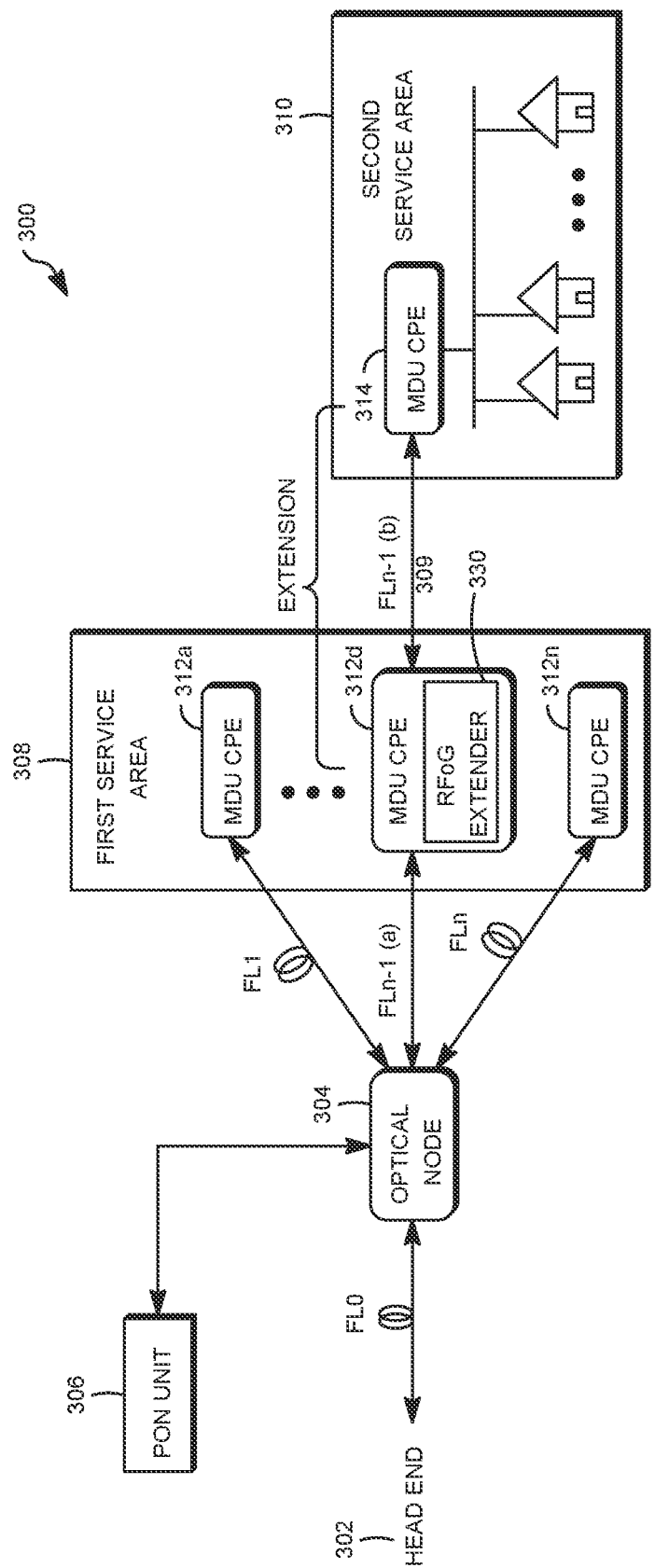
FIG. 3 depicts an example of an RFoG architecture having an RFoG extender.

FIG. 3 depicts an example of a block diagram of an RFoG architecture 300. The RFoG architecture 300 is similar to the RFoG architecture 100 of FIG. 1 as described above with an exception that at least one MDU CPE among a plurality of MDU CPE 312a-MDU CPE 312n includes at least one RFoG extender 330. In the example shown in FIG. 3, the MDU CPE 312d includes the RFoG extender 330. Although, only one MDU CPE 312d is shown to include the RFoG extender 330, other MDU CPEs 312a-c and MDU CPEs 312d-n may also include the RFoG extender 330. Also, the RFoG extender 330 is shown to be implemented in the MDU CPE of the first service area 308 as illustrated in FIG. 3, however, the RFoG extender 330 may be implemented in the MDU CPE (for example, the MDU CPE 314) of the second service area 310. Furthermore, even though the RFoG architecture includes MDU CPE in the first service and the second service area, a CPE may be implemented in the first and the second service area with an RFoG extender in the CPE of one of the first or the second service area. An optical node 304 is also coupled to a PON unit 306 to provide data services to a PON network (not shown).

The RFoG extender 330 functions to provide cable services (both traditional service and PON service) to the customers in the first service area 308 and serves to extend the cable services from the first service area 308 to the second service area 310, which is remote from the first service area 308. As shown, the RFoG extender 330 can serve customers in the first service area 308, and it can also provide an optical link (input/output) 309 to serve one or more customers in the second service area 310. In one implementation, the optical input/output is provided via an optical link, such as a fiber added between the MDUCPE 312d including the RFoG extender 330 of the first service area 308 and the MDU CPE 314 of the second service area 310 to extend the DS signal to the second service area 310. Similar to the other MDU CPEs 312a-c and MDUCPE 312e-n, the MDU CPE 312d with the RFoG extender 330 is optically coupled to the optical node 304 to receive the downstream (DS) signal from the optical node 304 and to send the upstream (US) signal to the optical node 304. The MDU CPE 313d with the RFoG extender 330 is also coupled to send the DS signal to MDU CPE 314 of the second service area 310. In one implementation, the MDU CPE 312d with the RFoG extender 330 is also coupled to receive the US signal from the MDU CPE 314 of the second service area 310. As such, the RFoG extender in the first service area 308 extends the US signal from the second service area 310 to the head end 302. The details of the RFoG extender 330 are provided herein below.

Figure 2A:
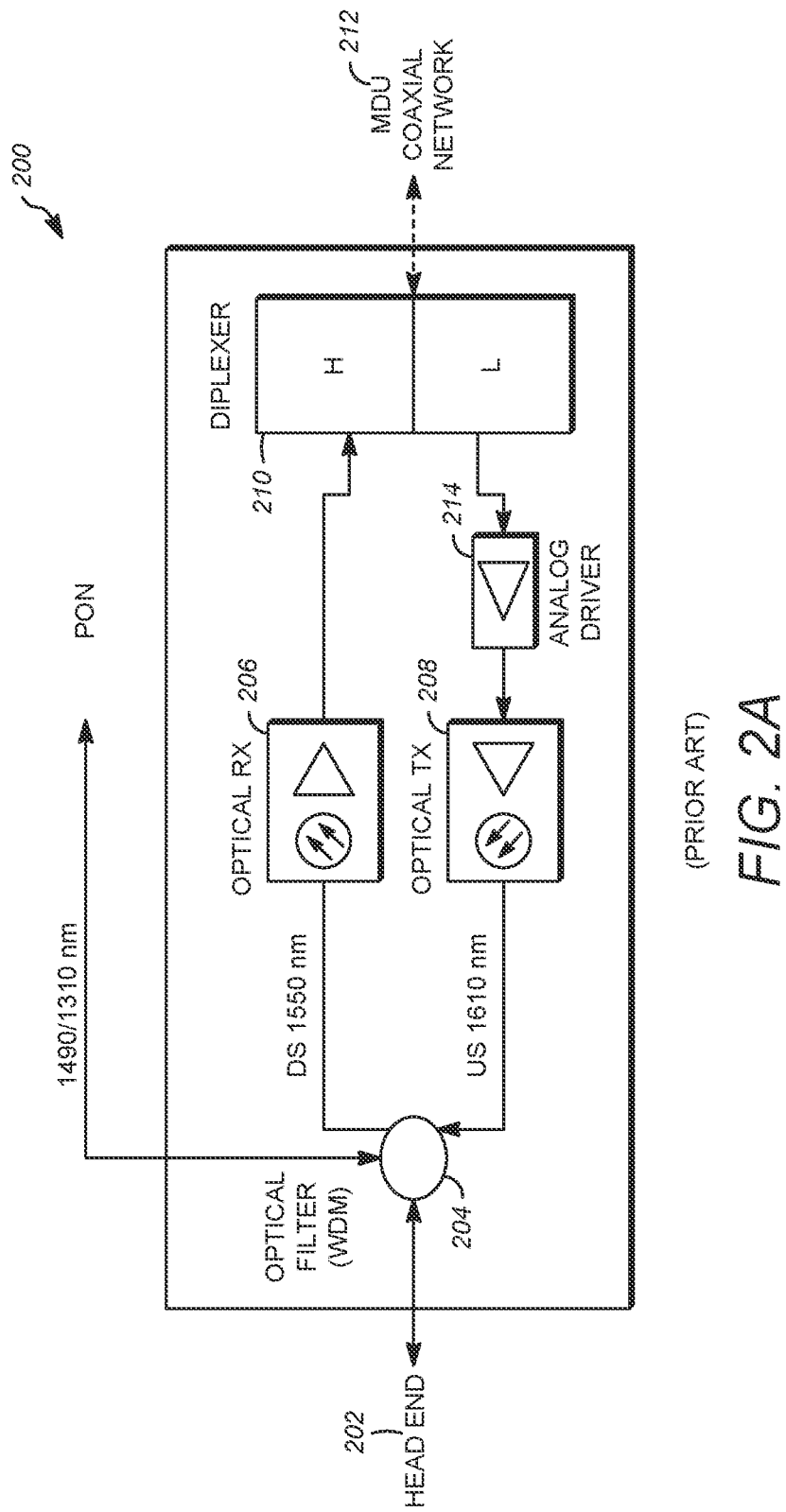
FIG. 2A shows a conventional MDU CPE device.
Figure 4A:
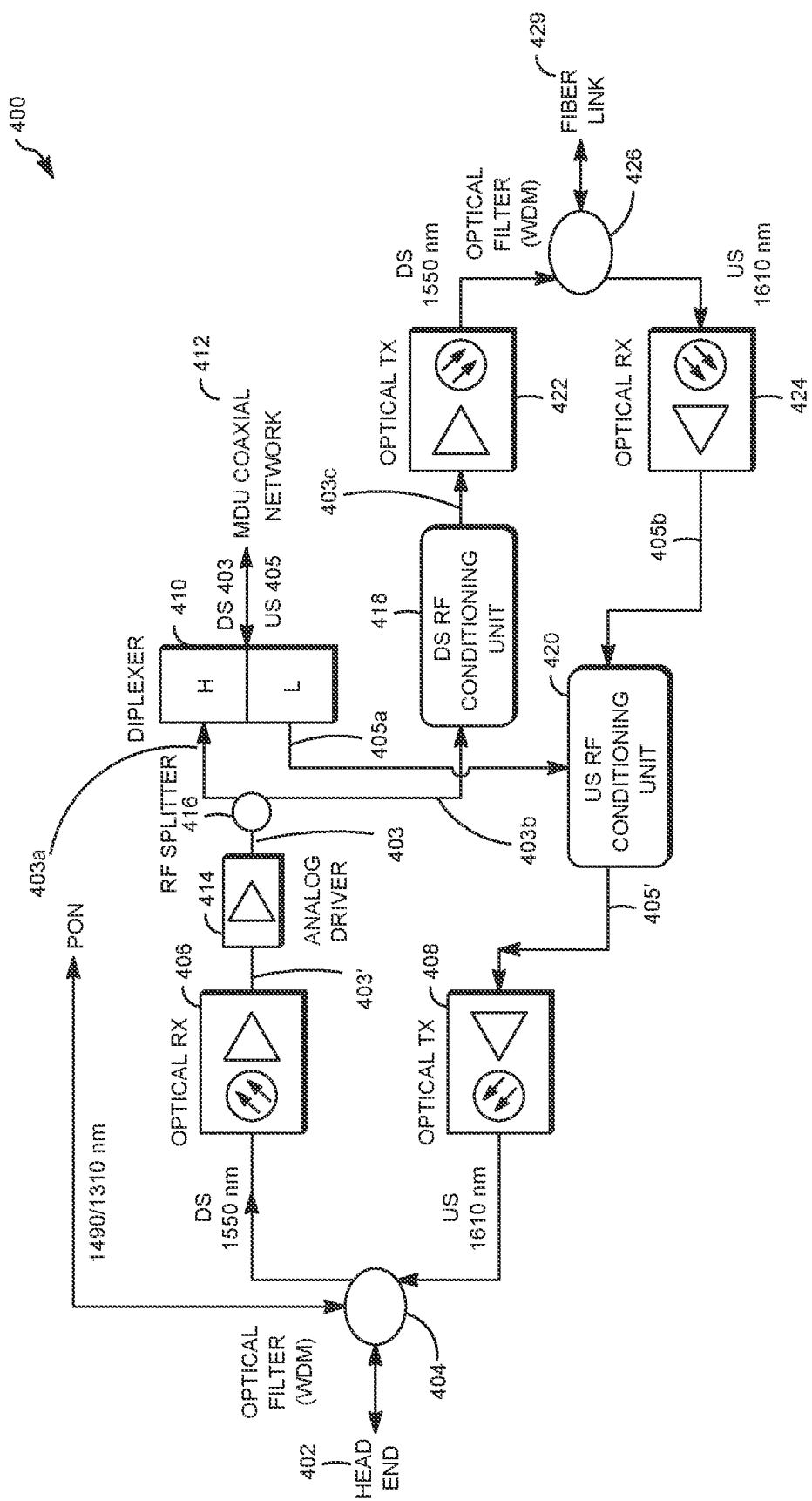
FIG. 4A shows an example of a MDU CPE device.

FIG. 4A depicts an example of a schematic diagram of a MDU CPE device 400. The MDU CPE device 400 is similar to the MDU CPE device 200 as illustrated in FIG. 2A with the exception that the MDU CPE device 400 includes at least one RFoG extender 430. The RFoG extender 430 includes a first RF splitter 416, a downstream radio frequency (DSRF) conditioning circuit 418, an upstream radio frequency (USRF) conditioning circuit 420, a RFoG extender optical TX 422, a RFoG extender optical RX 424, and a RFoG extender WDM filter 426. In one implementation, the RFoG extender 430 functions as a RFoG extension to process and extend the DS signal from a first service area (for example, the first service area 308 in FIG. 3) to a second service area, which is remote from the first service area (for example, the second service area 310 in FIG. 3) as described in greater detail below. In another implementation, the RFoG extender 430 functions as a RFoG extension at the first service area 308 to process and extend the US signal from the second service area (for example, the second service area 310 in FIG. 3) to the head end (for example, the head end 302 in FIG. 3) as described in greater detail below.

A RFoG WDM filter 404 is optically coupled to an optical node (not shown) which connects to a head end 202 and extracts the traditional cable services (DS optical signal having the wavelength of 1550 nm and US optical signal having the wavelength of 1610 nm). The RFoG WDM filter 404 transmits the DS optical signal to an RFoG optical RX1406, which converts the DS optical signal into an RF domain resulting in a DSRF signal 403' containing data and transmits to the analog driver 414. In one example, the analog driver is an RF amplifier, which functions to increase the power of the DSRF signal resulting in a DSRF signal 403 The analog driver 414 transmits the DSRF signal 403 to the first radio frequency (RF) splitter 416, which separates the DSRF signal 403 into two separate DSRF signals such as a first DSRF signal 403a and a second DSRF signal 403b. In one implementation, the DSRF signal 403 (output of the analog driver 414) is equally separated such that the first DSRF signal 403a contains fifty percent of the DSRF signal 403 and the second DSRF signal 403b also contains the fifty percent of the DSRF signal 403. Although, the implementation as described equally separates the DSRF signal, the DS signal may be unequally split into two separate signals as per configuration requirements of the analog driver 414. The first DS RF signal 403a is transmitted to the diplexer 410, which filters the first DSRF signal 403a in high frequency mode and outputs a filtered DSRF signal 403 to a MDU coaxial network 412 for connection to different users.

The second DSRF signal 403b is transmitted into the DSRF conditioning circuit 418, which functions to process full RF load of the second DSRF signal 403b. In one implementation, the DSRF conditioning circuit 418 functions to multiplex all the DSRF signals, maintain stable gain of the RF path, equalizes the DSRF signal to flatten the RF gain over the entire DS RF bandwidth, attenuates to control RF gain over the link, improves signal quality and compensates for fiber dispersion and stimulate brillouin scattering (SBS)) suppression to reduce fiber non-linearity. The DSRF conditioning unit 418 may also filter out desired channels and down convert the desired channels. In one implementation, the DSRF conditioning circuit 418 may be designed for direct modulation (such as multi-carrier modulation techniques, e.g. orthogonal frequency division multiplexing (OFDM)) or for external modulation with a difference residing in the pre-distortion and the bias connections for the external modulation. The DSRF conditioning circuit 418 may further function to condition the modulated signal into a format that can be sent through the network.

In one implementation, the DSRF conditioning circuit 418 processes a complete full RF load of the second DS RF signal 403b as described in further detail below with respect to FIG. 5A. In another implementation, the DSRF conditioning circuit 418 processes a channel segmentation RF load of the second DSRF signal 403b as described in greater detail herein below with respect to FIG. 5B.

Figure 4B:
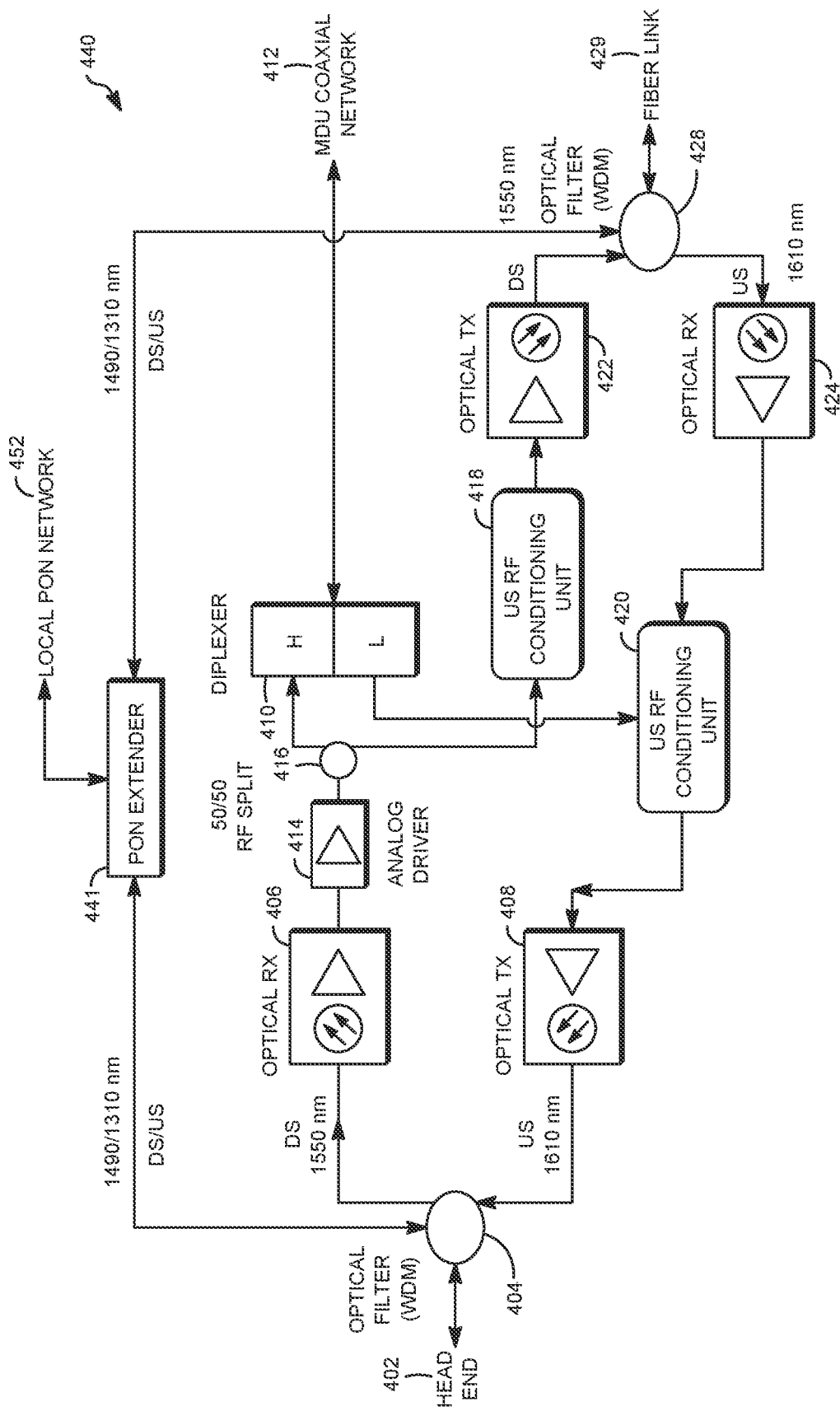
FIG. 4B illustrates an example of a MDU CPE device with an integration of a PON extender.
Figure 5A:
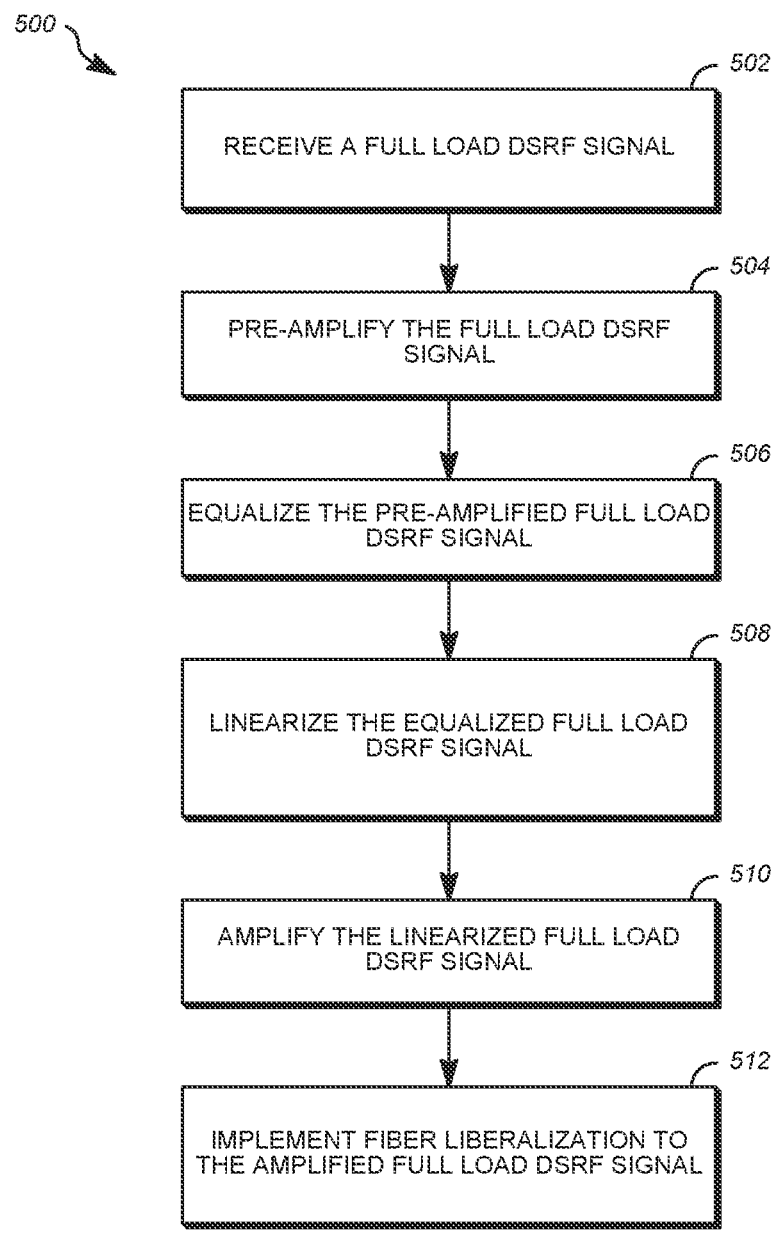
FIG. 5A depicts a flow chart illustrating radio frequency (RF) processing of a full RF load of a downstream signal.

FIG. 5A is a flow chart 500 illustrating one implementation of RF processing 500 of the DSRF conditioning circuit 418 performed on a full RF load of the second DSRF signal 403b of FIGS. 4A and 4B. In one implementation, the RF processing 500 is programmable over the DSRF conditioning unit 418. In one implementation, the full RF load of the second DSRF signal includes broadcast and narrowcast channels. The broadcast channels (services) are provided where the same content is broadcast to multiple subscribers that share the available bandwidth. The narrowcast channels (services) are provided where the content is sent to a single subscriber through a dedicated link, and thus, the subscriber does not share the bandwidth with other subscribers. The full RF load of the second DSRF signal (a.k.a. full load DSRF signal) includes a full bandwidth of the DS signal. Accordingly, the entire bandwidth of the DSRF signal is extended from the first service area to the second service area. In one implementation, the full load DSRF signal is dependent on the bandwidth of a standard data over cable interface specification (DOCSIS). For example, DOCSIS 3.1 standard expands available bandwidth in the network to 1.218 Ghz and then to 1.794 Ghz. In another example, the DOCSIS 3.1 has orthogonal frequency division multiplexing (OFDM) channel over the entire spectrum available for downstream and upstream communication.

Referring to step 502, a full load DSRF signal is received. At step 504, the full load DSRF signal is pre-amplified for power level adjustment. In one implementation, the pre-amplification functions to convert a low power radio frequency signal to a high power radio frequency signal. As such, the pre-amplification tunes the full load DSRF signal to nominal amplitude level. In one implementation, a configurable gain in amplitude is achieved depending on requirements. Then, at step 506, the pre-amplified full load DSRF signal is equalized to keep the power level constant over the entire bandwidth (gain flatness). In one implementation, the equalization is performed to flatten the frequency response of the full load DSRF signal at a nominal frequency. In one implementation, a specific level of flatness/tilt over a bandwidth of interest is achieved. Then at step 508, linearization is performed to the full load DS RF signal to compensate for RF pre-distortion in the full load DSRF signal to improve the non-linear behavior of the RF and to compensate for the fiber dispersion in the optical link between the first service area and the second service area. In one implementation, an RF gain is controlled (automatic gain control) over the link. As discussed above, the optical link is a fiber added between an MDU CPE including the RFoG extender of the first service area and the MDU CPE of the second service area to extend the DS signal to the second service area. Since, the DSRF signal is being transmitted to a longer fiber distance due to the DS RF signal being extended to the second service area, the linearization configures the pre-distortion and fiber dispersion for the optical link in order to compensate for the optical fiber non-linearity in the DS signal. Then at step 510, the linearized full load DSRF signal is amplified to amplify the DSRF signal to the RF level desired at the second service area. Then at step 512, implement fiber linearization to the amplified full load DSRF signal in order to ensure good signal quality for the extension of the DSRF signal. In one implementation, a good signal quality is achieved for a specific fiber link distance. The fiber linearization functions to further reduce the non-linearity in the optical link. Some examples of the non-linearity in the optical fiber may include simulated scattering, self-phase modulation, cross-phase modulation etc. In one implementation, the non-linearity is reduced for a specific fiber link distance.

Figure 5B:
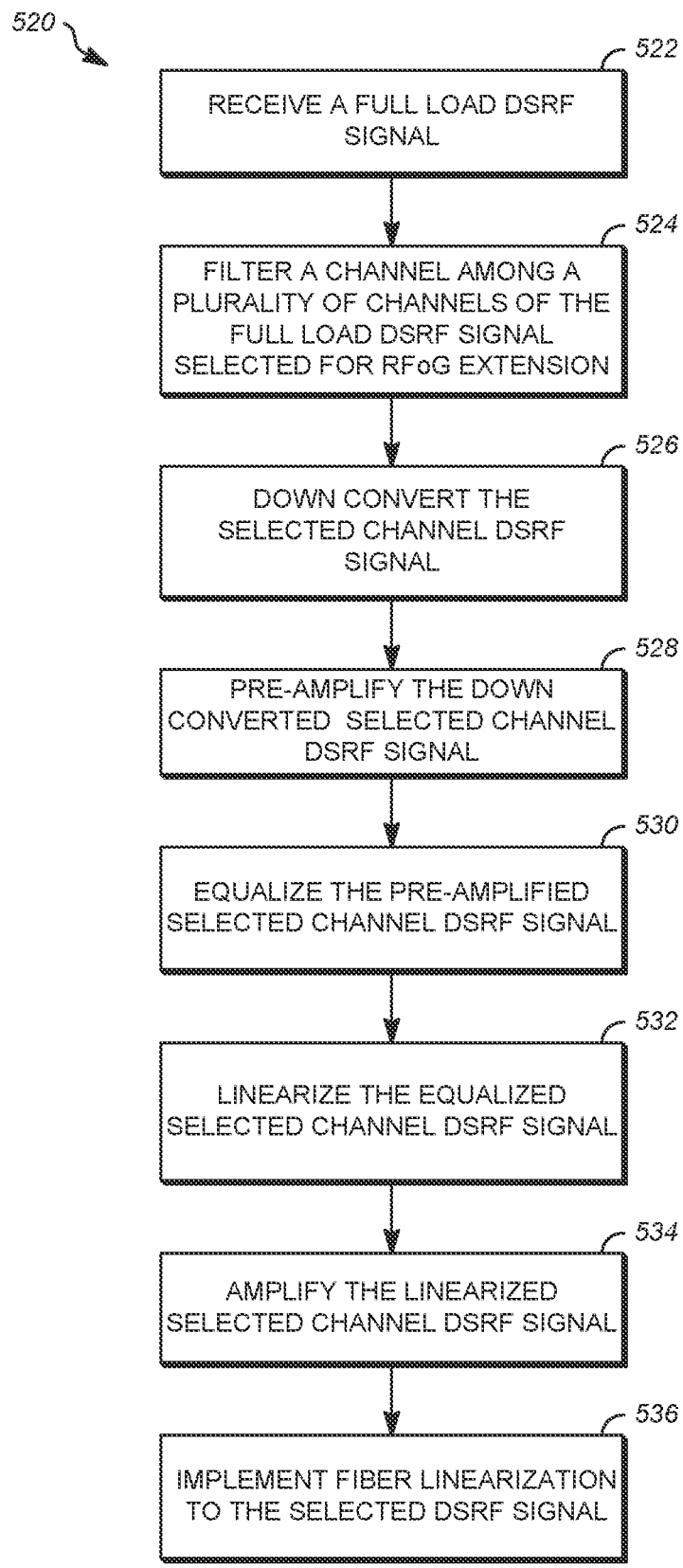
FIG. 5B shows a flow chart illustrating radio frequency (RF) processing of a channel segmentation of a RF load of the downstream signal in accordance with another example of the present disclosure.

FIG. 5B is a flow chart 520 illustrating another implementation of the RF processing 520 of the DSRF conditioning circuit 418 performed on a channel segmentation RF load of the second DSRF signal 403b of FIGS. 4A and 4B. In one implementation, the RF processing 520 is programmable over the DSRF conditioning unit 418. The channel segmentation RF load of the second DSRF signal (a.k.a. channel segmented DSRF signal) includes selected channel bandwidth of the DSRF signal. Accordingly, a selected channel bandwidth of the DSRF signal is extended from the first service area to the second service area. In one implementation, the channel segmented DSRF signal is dependent on the bandwidth of the standard DOCIS. For example, DOCSIS 3.1 utilizes OFDM channels, which occupy a frequency range spectrum from 24 Mhz to 192 Mhz.

Referring to step 522, a full load second DSRF signal is received. At step 524, one or more channels in the bandwidth of the full load second DSRF signal is filtered to be selected for the RFoG extension. In one implementation any of the OFDM channel on the DSRF bandwidth is filtered, In one example, the selected channel is a specific orthogonal frequency division multiplexing (OFDM) channel in which the RF channels having frequency from 24 Mhz to 192 Mhz in the OFDM are selected. At step 526, the selected channel of the full load DSRF signal is down converted to a lower bandwidth of the selected channel such that the DS signal begins at a lower bandwidth of the selected channel. In one implementation, the selected channel DSRF signal is down converted to a potentially lowest frequency in the selected channel. In one implementation any OFDM channel on the DSRF bandwidth is down converted.

At step 528, a down converted selected channel of the full load DSRF signal is pre-amplified for power level adjustment. As discussed above, the pre-amplification functions to convert a low power radio frequency signal to a high power radio frequency signal. As such, the pre-amplification tunes the DS signal to nominal amplitude level. In one implementation, a configurable gain in amplitude is achieved depending on requirements. Then, at step 530, the pre-amplified selected channel of the full load DSRF signal is equalized to keep the power level constant. As discussed above, the equalization is performed to flatten the frequency response of the selected channel of the DS signal at a nominal frequency. In one implementation, a specific level of flatness/tilt over a bandwidth of interest is achieved. Then at step 532, the equalized selected channel of the full load DSRF signal is linearized to compensate for RF pre-distortion in the selected channel DSRF signal to improve the non-linear behavior of the RF and to compensate for the fiber dispersion in the optical link between the first service area and the second service area. In one implementation, an RF gain is controlled (automatic gain control) over the link. Then at step 534, the linearized selected channel of the full load DSRF signal is amplified to amplify the DSRF signal to the RF level desired at the second service area. At step 536, a fiber linearization is implemented to the amplified selected channel of the full load DSRF signal after the amplification in order to ensure good signal quality for the extension of the DSRF signal. In one implementation, a good signal quality is achieved for a specific fiber link distance. As discussed above, the fiber linearization functions to further reduce the non-linearity in the optical link. Some examples of the non-linearity in the optical fiber may include simulated scattering, self-phase modulation, cross-phase modulation etc. In one implementation, the non-linearity is reduced for a specific fiber link distance.

Referring back to FIG. 4A, the output of the DSRF conditioning circuit 418 is a second DSRF signal 403c (one of fiber linearized full load DSRF signal or fiber linearized selected channel DSRF signal), which is transmitted to the RFoG extender optical TX 422. The RFoG extender optical TX 422 converts the second DSRF signal 403c from the RF domain to an optical domain into the second DS optical signal. The second DS optical signal is transmitted by the RFoG extender WDM 426 to the second service area (for example, the second service area 310 in FIG. 3) via a fiber link 429. As such, the DS optical signal is extended from the MDU CPE 400 of a first service area (for example the first service area 308 in FIG. 3) to a MDU CPE (not shown) of a second service area (for example, the second service area 310 in FIG. 3).

The MDU coaxial network 412 sends a USRF signal 405 as an input to the diplexer 410. The diplexer 410 filters the USRF signal 405 in the low frequency mode resulting in a USRF signal 405a and transmits to the USRF conditioning circuit 420. An US optical signal is received by the RFoG extender WDM filter 426 from a second service area (not shown) via the fiber link 429 The RFoG extender WDM filter 426 filters the US optical signal and sends it to the RFoG extender optical RX2 424, which converts it into RF domain into a USRF signal 405b and transmits it to the USRF conditioning circuit 420. The USRF conditioning circuit 420 combines both the USRF signals 405a and 405b processes the combined USRF signal to generate USRF signal 405'. As such, the US RF signal is extended from a MDU CPE (not shown) of a second service area (for example, the second service area 310 in FIG. 3) to the head end (e.g. 402 in FIG. 4 or 302 in FIG. 3). In one implementation, the US RF conditioning circuit 420 functions similar to the DS RF conditioning circuit 418 as described above. In one implementation, the USRF conditioning circuit 420 functions to multiplex all the USRF signals, maintains stable gain of the RF path, equalizes the USRF signal to flatten the RF gain over the entire USRF bandwidth, attenuates to control RF gain over the link, improves signal quality and compensates for fiber dispersion and stimulate brillouin scattering (SBS)) suppression to reduce fiber non-linearity. The USRF conditioning unit 420 may also filter out desired channels and down convert the desired channels. In one implementation, the USRF conditioning circuit 420 may be designed for direct modulation (such as multi-carrier modulation techniques, e.g. orthogonal frequency division multiplexing (OFDM)) or for external modulation with a difference residing in the pre-distortion and the bias connections for the external modulation. The US RF conditioning circuit 420 may further function to condition the modulated signal into a format that can be sent through the network.

In one implementation, for processing of the USRF signal is similar to the processing described with respect to FIGS. 5A and 5B above for the full load DSRF signal and the channel segmented DSRF signal respectively. In one implementation, the output of the USRF conditioning circuit 420 is a processed USRF signal 405', which includes flatness of the frequency response, configuration of the pre-distortion and fiber dispersion for the optical link to compensate for the optical fiber non-linearity in the US signal and amplification in the US signal to achieve a very good quality US Signal with the expected optical power level based on the network extension distance. The USRF signal 405' is converted back into optical domain by the RFoG optical TX1408 as an US optical signal and send to the RFoG WDM filter 404 to be transmitted to the head end 402. Also, shown in FIG. 4A is a link from the RFoG WDM filter 404 to couple with a PON (not shown) to provide PON cable services outside of the MDU CPE device 400.

Figure 6A:
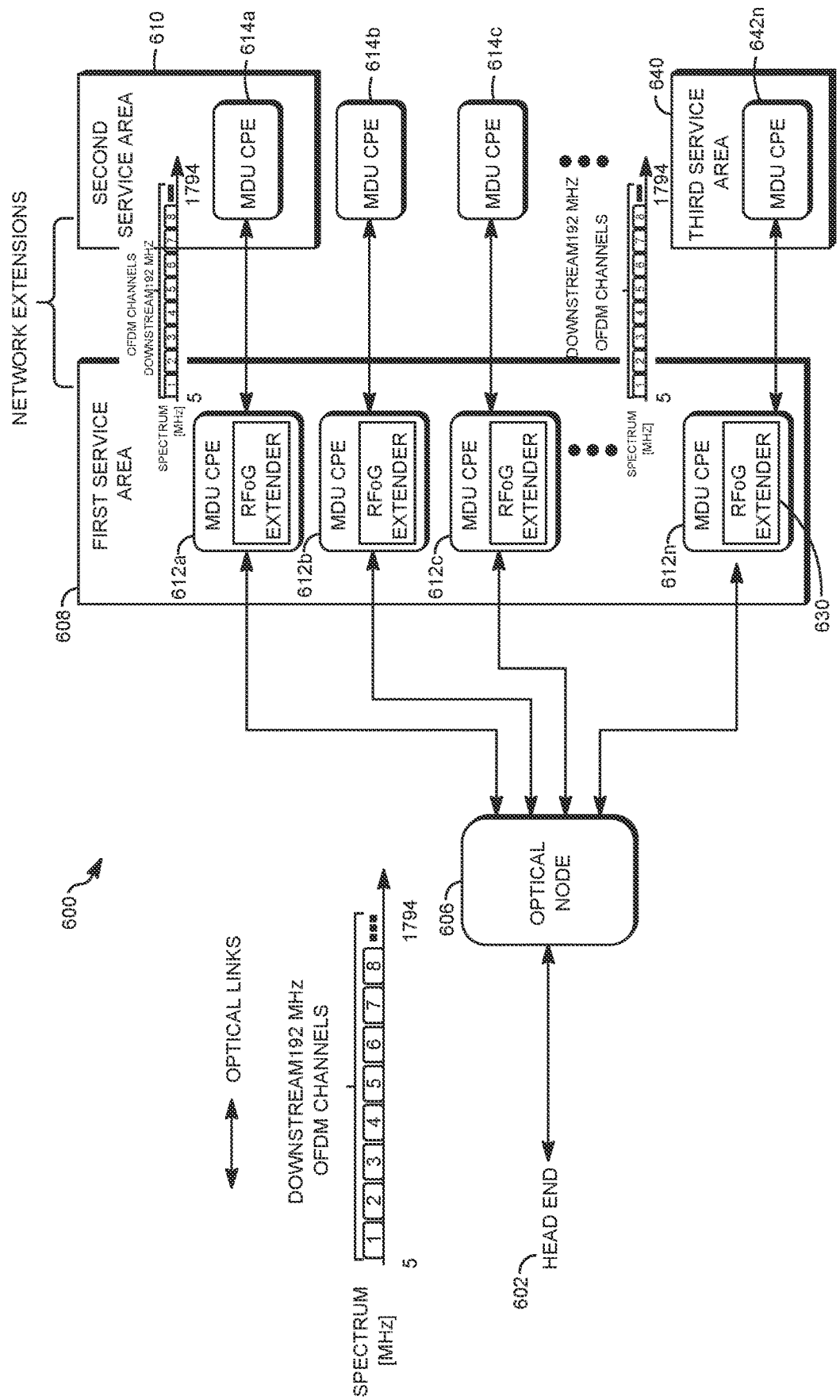
FIG. 6A illustrates an RFoG architecture of a full RF load of the downstream signal in accordance with an example of the present disclosure.

FIG. 6A illustrates an example of a block diagram of a RFoG architecture 600, which functions to extend a complete full RF load of the DS signal (for example second DS RF signal 403b of FIG. 4A) to multiple MDU CPE devices. The RFoG architecture 600 is similar to the RFoG architecture 300 of FIG. 3 with the exception that the RFoG architecture 600 includes additional new remote service area (a.k.a. third service area) 640 and multiple MDU CPEs 612a-612n including their corresponding RFoG extenders 630a-630n in the first service area 608. The RFoG extenders 630a-630n is the same as the RFoG extender 330 provided in FIG. 3. As shown, each of the MDU CPEs 612a-612n including the corresponding RFoG extenders 630a-630n in the first service area 608 are coupled to the optical node 606, which is coupled to the head end 602.

In one implementation, the head end 602 transmits a full RF load of the DS signal to the optical node 606. As discussed above, in one implementation, the full RF load of the DS signal includes broadcast and narrowcast channels. The broadcast channels (services) are provided where the same content is broadcast to multiple subscribers that share the available bandwidth. The narrowcast channels (services) are provided where the content is sent to a single subscriber through a dedicated link, and thus, the subscriber does not share the bandwidth with other subscribers. In this example shown in FIG. 6A, the full RF load of the DS signal is in the range of 5 MHz to 1794 MHz. The Optical Node 606 transmits all of the full RF load of the DS signal to each of the MDU CPEs 612a-612n in the first service area 608. In one implementation, the RFoG extenders 630a-630n in their corresponding MDU CPEs 612a-612n perform the RF processing 500 as discussed with respect to FIG. 5A above, which provides capability for each of the RFoG extenders 630a-630n to transmit the full RF load of the DS signal to the second and the third service areas 610 and 640 respectively. In one implementation, as shown, each of the RFoG extenders 630a-630c not only provide full RF load of the DS signal to their corresponding MDU CPE 612a-612c in the first service area 608 but also extend the full RF load of the DS signal to the corresponding MDU CPE 614a-614c in the second service area 610. In one implementation, the RFoG extender 630n serves to provide full RF load of the DS signal to the corresponding MDU CPE 614n of the first area 608 and extend the full RF load of the DS signal from the first service area 608 to a corresponding MDU CPE 642n of the third service area 640. In one implementation, the RFoG extenders 630a-630n perform the RF processing of the US signal (as described above with respect to US conditioning circuit), which provides capability for each of the RFoG extenders 630a-630n of the first service area 608 to receive the US signal from the second and third service areas 610 and 640 respectively, As such, the US RF signals are extended from the second and the third service areas 610 and 640 respectively to the head end 602.

Although the RFoG extenders 630a-630c are shown to be implemented in the MDU CPEs of the first service area 608 as illustrated in FIG. 6, it should be apparent that the RFoG extenders 630a-630c may be implemented in the MDU CPE (for example, the MDU CPE 614a-614c) of the second service area 610. Similarly, the RFoG extender 630n may be implemented in the MDU CPE (for example, the MDU CPE 642n) of the third service area 640. In one implementation, both the first and the second service areas 608 and 610 respectively may include the MDU CPEs with the RFoG extender(s) 630 and third service area 640 include the MDU CPE 642n without the RFoG extender. In another implementation, the first and the third service areas 608 and 640 respectively may include the MDU CPEs with the RFoG extender(s) 630 and the second service area includes the MDU CPE without the RFoG extender. In a further implementation, the second and the third service areas 610 and 640 respectively may include the MDU CPEs with the RFoG extender(s) 630 and the first service area 608 includes the MDU CPE without the RFoG extender.

In one implementation, the RFoG extender would be selected to be placed in the MDU CPE of a service area among a plurality of service areas where the RFoG is to be extended to the other service area (remote from the plurality of service areas), for example, based on network coverage distance between each of the plurality of the service areas and the another service area. The service area among the plurality of service areas having the minimal network coverage distance may be selected for the placement of the RFoG extender. In the example of the RFoG architecture 600 illustrated in FIG. 6A, network coverage distance from the first service area 608 to the third service area 640 is smaller than the network coverage distance from the second service area 610 to the third service area 630. As such, the RFoG extender 630 is implemented in the MDU CPE (for e.g. the MDU CPE 612n) of the first service area 608 as shown in FIG. 6A. In another example (not shown), the network coverage distance from the first service area 608 to the third service area 640 is larger than the network coverage distance from the second service area 610 to the third service area 640. In this example, the RFoG extender would be implemented in the MDU CPE 614n of the second service area 610

Figure 6B:
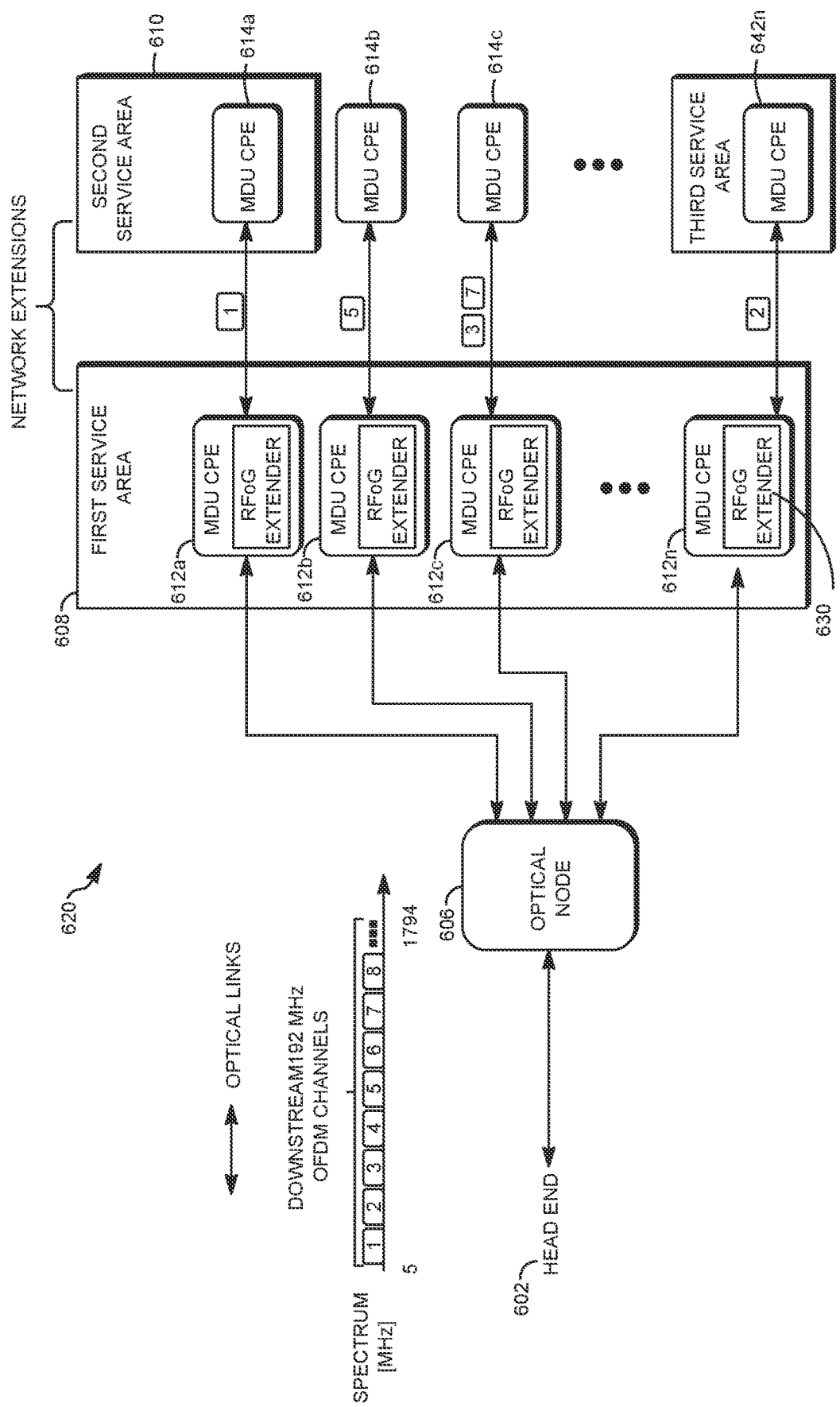
FIG. 6B illustrates an RFoG architecture of a channel segmentation of a RF load of the downstream signal in accordance with another example of the present disclosure.

FIG. 6B illustrates an example of a block diagram of a RFoG architecture 650, which functions to extend a channel segmentation of the RF load of the DS signal (for example second DS RF signal 403b of FIG. 4A) to multiple MDU CPE devices. The RFoG architecture 650 is similar to the RFoG network 600 of FIG. 6A except that the RFoG architecture 650 extends selected channels in the bandwidth of the full RF load of the DS signal for extension while the RFoG architecture 600 extends the full RF load of the DS signal. In one implementation, the head end 602 transmits a full RF load of the DS signal to the Optical Node 606. In this example shown in FIG. 6B, the full RF load of the DS signal is in the range of 5 MHz to 1794 MHz. The Optical Node 606 transmits all of the full RF load of the DS signal to each of the MDU CPEs 612a-612n including their corresponding RFoG extenders 630a-630n in the first service area 608. The RFoG extenders 630a-630n perform the RF processing 520 as discussed with respect to FIG. 5B above and thus, each of the RFoG extenders 630a-630n is capable of transmitting the processed selected channel in the bandwidth of the full RF load of the DS signal to the second and the third service areas 610 and 640 respectively. In one example, the selected channel is an orthogonal frequency division multiplexing (OFDM) channel in which the RF channels in the OFDM are selected. Each of the channels 1-8 shown in FIG. 6B for example include 192 MHz OFDM channels. In one example, as shown in FIG. 6B, each of the channels 1, 2, 3, 5 and 7 of the full RF load of the DS signal are selected and down converted and further processed as described above with respect to the RF processing 620 and then are capable to be transmitted to second and third service areas 610 and 640 respectively. In one implementation, one of the advantages of selecting specific channels to be filtered and down converted before the transmission for the network extension is a reduction in channel bandwidth. This reduction in the channel bandwidth results in reduction in complexity for the DSRF conditioning circuit for gain, flatness, predistortion, etc. Further, the signal quality can be achieved easier compared to the transmission of the full RF load (higher bandwidth). As illustrated in FIG. 6B, the RFoG extender 630a in the MDU CPE 612a extends transmission of channel 1 to the corresponding MDU CPE 614a of the second service area 610. Similarly, the RFoG extender 630b in the MDU CPE 612b extends transmission of channel 5 to the corresponding MDU CPE 614b of the second service area 610 and the RFoG extender 630n in the MDU CPE 612n extends transmission of channel 2 to the corresponding MDU CPE 642n of the third service area 640. In one implementation, the RFoG extender 630c of the MDU CPE 612c combines channels 3 and 7 and transmits them together to the corresponding MDU CPE 614c of the second service area 610. In one implementation, by combining the two channels, less bandwidth is utilized for their transmission to the service areas.

Figure 7:
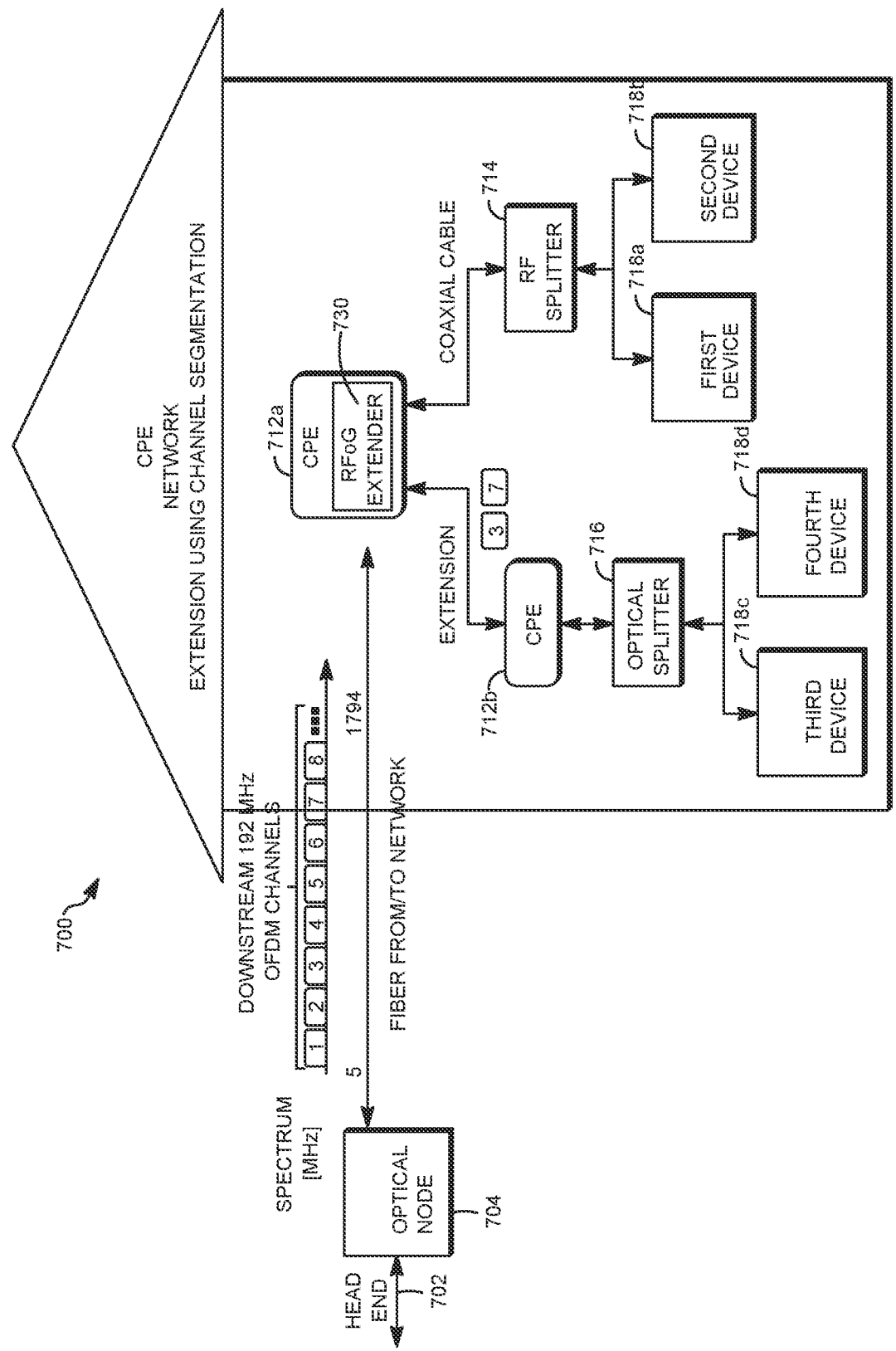
FIG. 7 illustrates a block diagram of a customer premises equipment (CPE) RFoG architecture 700 of a full RF load of the DS signal and the channel segmentation of the RF load of the DS signal in accordance with an example of the present disclosure.

FIG. 7 illustrates an example of a block diagram of a CPE RFoG architecture 700, which functions to extend optical network of both full RF load of the DS signal and the channel segmentation of the RF load of the DS signal in an indoor environment. An example of the indoor environment is a single family home. As shown, the CPE RFoG architecture 700 may include multiple devices such a first device 718a, a second device 718b, a third device 718c and a fourth device 718d and extension capability of the RFoG is provided to the multiple devices 718a-718d. The multiple devices may include, but not limited to, a television, a personal computer, a laptop, a smart phone or combinations thereof. In one implementation, a bandwidth requirement is set up for one or more of the multiple devices 718a-718d. As shown, an optical node 704 is optically coupled to a head End 702 to receive DS and transmit US signals. The optical node 704 is coupled to a CPE 712a including an RFoG extender 730, which receives a full RF load of the DS signal. In one implementation, the RFoG extender 730 functions to extend the full RF load of the DS signal from the CPE 712a to the first and second devices 718a and 718b respectively. A second RF splitter 714 is coupled to the CPE 712a to split the full RF load of the DS signal between the first and the second device 718a and 718b respectively. In one implementation, the RFoG extender 730 functions to extend selected channels in the bandwidth of the full RF load of the DS RF signal to the third and fourth devices 718c and 718d respectively. In one example, channels 7 and 8 are selected and down converted and further processed as described above with respect to the RF processing 620 and then are transmitted to an optical splitter 716, which splits the channels such that channel 7 is extended to the third device 718c and channel 8 is transmitted to the fourth device 718d or vice versa. As such, bandwidth capability of a CPE is extended by the RFoG extender 730 by transmitting each of the separate selected channels into their respective devices. Accordingly, applications running in each of the third and fourth devices 718c and 718d do not interfere with each other.

Figure 2B:
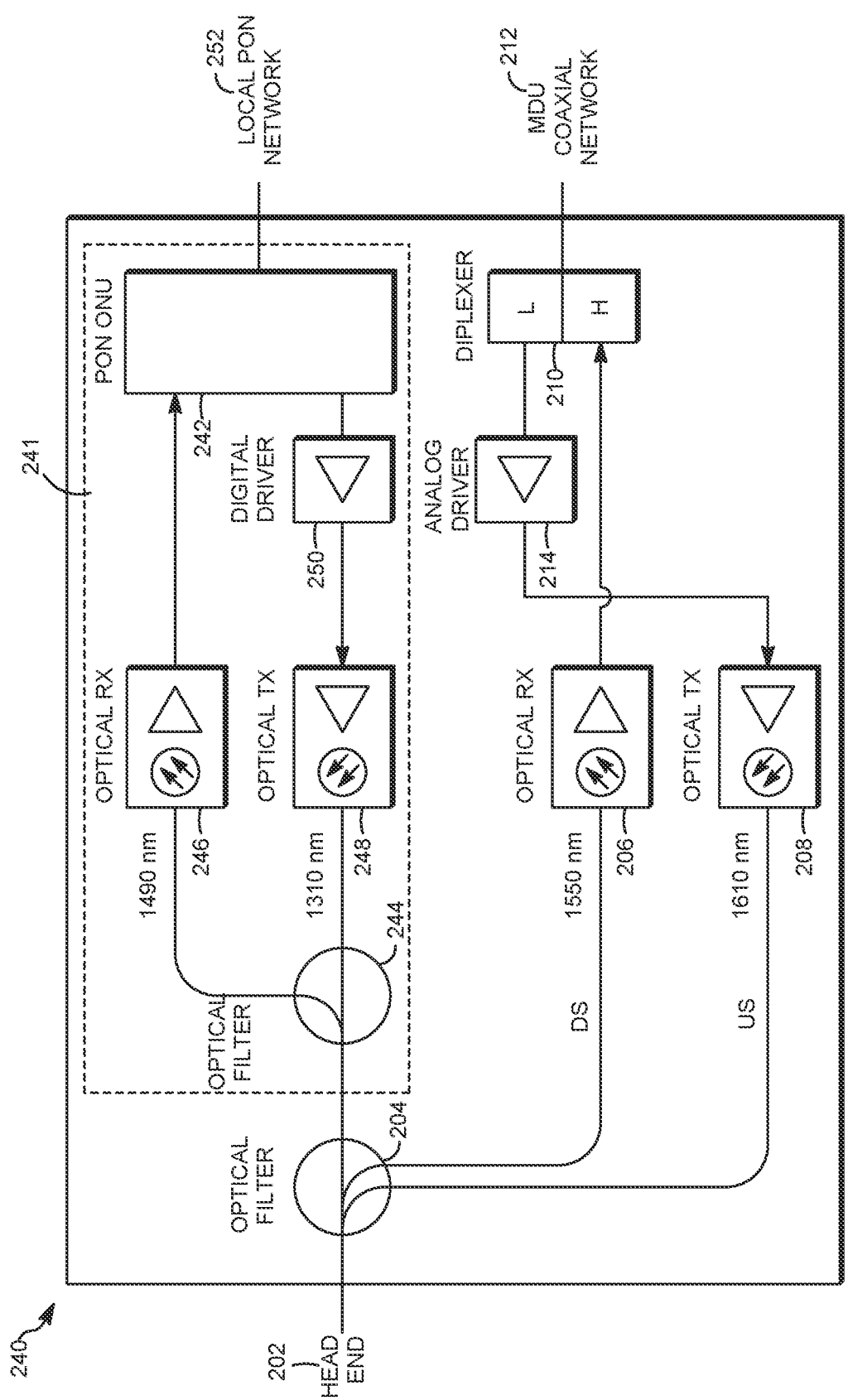
FIG. 2B illustrates a conventional MDU CPE device with integration of a PON extender.

FIG. 4B depicts an example of a schematic diagram of a MDU CPE device 440. The MDU CPE device 440 is similar to the MDU CPE 440 as illustrated in FIG. 4A with the exception that the MDU CPE 440 includes a PON extender 441 integrated within the MDU device 440 such that one MDU CPE may support both the traditional cable service (Coaxial) and the PON service. The PON extender 441 is same as the PON extender 241 of FIG. 2B. As shown, the PON extender 441 is also coupled to the RFoG/PON extender WDM filter 428, which extracts the PON signals (DSPON optical signal having the wavelength of 1490 nm and USPON optical signal having the wavelength of 1310 nm). The RFoG/PON extender WDM filter 428 transmits the DSPON optical signal to the second service area via the fiber link 429, As such, the DSPON signal is extended from the MDU CPE 440 of a first service area (for example the first service area 308 in FIG. 3) to a MDU CPE (not shown) of a second service area (for example, the second service area 310 in FIG. 3). The USPON signal is received by the RFoG/PON extender WDM filter 428 from a second service area (not shown) via the fiber link 429, which is transmitted to the PON extender 441. As such, the USPON signal is extended from the second service area via the fiber link 429 to the head end 402. Accordingly, the MDU CPE device 420 not only provides capability to receive and extend the traditional cable service of the MCU Coaxial Network 412 but also provides the capability to receive and extend the PON service of the local PON network 452. In one implementation, the MDU CPE 440 of FIG. 4B function to receive and extend the RFoG services and at the same time function to receive and extend the PON services.

As disclosed herein, the ability to extend RFoG network coverage with an RFoG extender reduces or prevents the need to install any additional node or optical amplifiers, thus providing for a more simple and cost effective RFoG system with reduced power consumption. The RFoG extender is flexible enough to be implemented at a specific MDU CPE as needed, and the MDU CPE with the RFoG extender may be implemented on specific service areas where network extensions are beneficial. Furthermore, with respect to network topology, the RFoG extender at a customer location MDU CPE allows for the possibility to migrate the HPON network from a single level optical fiber tree topology (Node to CPEs) to a multi-level fiber tree and branch network topology (Node to CPEs to other CPEs). Additionally, by processing the US and DS signals, the quality of these signals are not comprised with an implementation of the RFoG extender.

It will be understood that the terms and expressions used herein have the ordinary meaning as it is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical or similar elements in the process, method, article, or apparatus that comprises the element.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals. Each of the various couplings may be considered a separate communications channel.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. An RFoG extender for a radio frequency over glass (RFoG) network, the RFoF extender comprising:
a first connection for receiving a downstream RF (DSRF) signal from, and transmitting an upstream optical signal to, a node; and
at least one second connection for transmitting the DSRF signal to at least one subscriber in a first service area and at least one subscriber in a second service area different from and remote from the first service area.

2. The RFoG extender of claim 1 including a first RF splitter that divides the DSRF signal into a first DSRF signal and a second DSRF signal.

3. The RFoG extender of claim 2 including a DSRF conditioning circuit to process the second DSRF signal.

4. The RFoG extender of claim 3 including an optical transmitter to convert the processed second DSRF signal into an optical domain and send the converted signal to the second service area.

5. The RFoG extender of claim 3 where the second DSRF signal is a full load DSRF signal, wherein the full load DSRF signal comprises broadcast and narrowcast channels, and the DSRF conditioning circuit is configured to:
   pre-amplify the full load DSRF signal to adjust a power level;
   equalize the pre-amplified full load DSRF signal to maintain the power level at a constant value;
   linearize the equalized full load DSRF signal to compensate for RF pre-distortion in the full load DSRRF signal and fiber dispersion in an optical link between the first service area and the second service area, wherein the optical link is configured to transmit the extended DSRF signal to the second service area;
   amplify the linearized full load DSRF signal to a RF level of the second service area; and
   implement fiber linearization to the amplified full load DSRF signal.

6. The RFoG extender of claim 3 where the second DSRF signal is a full load DSRF signal, wherein the full load DSRF signal comprises broadcast and narrowcast channels, and to process the full load DSRF signal, the DSRF conditioning circuit to is to:
   filter a channel among a plurality of channels of the full load DSRF signal selected to provide a link for extending the second DSRF signal to the second service area;
   down convert the selected channel of the full load DSRF signal to a lower bandwidth; pre-amplify the down converted selected channel of the full load DSRF signal to adjust a power level;
   equalize the pre-amplified selected channel of the full load DSRF signal to maintain power level at a constant value;
   linearize the equalized selected channel of the full load DSRF signal to compensate for RF pre-distortion in the selected channel of the full load DSRF signal and fiber dispersion in an optical link from the first service area to the second service area, wherein the optical link is configured to provide the extended DSRF signal to the second service area;
   amplify the linearized selected channel of the full load DSRF signal to a level of the second service area; and
   implement fiber linearization to the amplified selected channel of the full load DSRF signal.

7. The RFoG extender of claim 1 including at least one connection to receive an upstream radio frequency (USRF) signal wherein the USRF signal comprises a first USRF signal transmitted from a coaxial network and a second USRF signal transmitted from a second service area.

8. The RFoG extender of claim 7 further comprising an upstream conditioning circuit, wherein the US conditioning circuit combines the first USRF signal and the second USRF signal into a combined USRF signal.

9. The RFoG extender of claim 8 wherein the combined USRF signal is one of a full load USRF signal or a channel segmented USRF signal and the US conditioning circuit processes one of the full load USRF signal or the channel segmented USRF signal.

10. The RFoG extender of claim 1 residing in a first customer premises equipment (CPE) of the first service area where DSRF signal is extended from the first CPE of the first service area to a second CPE of the second service area.

11. The RFoG extender of claim 1 residing in a first multi-dwelling customer premises equipment (MDU CPE) of the first service area and the DSRF signal is extended from the first MDU CPE of the first service area to a second MDU CPE of the second service area.

* * * * *